United States Patent
Baldwin et al.

(10) Patent No.: US 9,954,939 B2
(45) Date of Patent: Apr. 24, 2018

(54) PROCESSING A MESSAGE RECEIVED BY A MESSAGE SERVER

(71) Applicant: INTERNATIONAL BUSINESS MACHINES CORORATION, Armonk, NY (US)

(72) Inventors: Timothy J. Baldwin, Hursley (GB); Andrew Johnson, Hursley (GB); Peter J. Johnson, Hursley (GB); Fenglian Xu, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 266 days.

(21) Appl. No.: 14/856,783

(22) Filed: Sep. 17, 2015

(65) Prior Publication Data
US 2016/0094640 A1  Mar. 31, 2016

(30) Foreign Application Priority Data
Sep. 25, 2014 (GB) .................................. 1416921.3

(51) Int. Cl.
*G06F 15/16* (2006.01)
*H04L 29/08* (2006.01)
*G06Q 50/00* (2012.01)

(52) U.S. Cl.
CPC ......... *H04L 67/1008* (2013.01); *G06Q 50/00* (2013.01); *H04L 67/1014* (2013.01)

(58) Field of Classification Search
CPC .. G06Q 50/00; H04L 67/1008; H04L 67/1014
See application file for complete search history.

(56) References Cited

U.S. PATENT DOCUMENTS

| | | | |
|---|---|---|---|
| 6,198,839 B1 | 3/2001 | Kuan et al. | |
| 7,099,935 B2 | 8/2006 | Jordan et al. | |
| 7,467,116 B2 | 12/2008 | Wang | |
| 7,685,089 B2 | 3/2010 | Nochta et al. | |

(Continued)

OTHER PUBLICATIONS

Bertsimas, Dimtris, "Robust and Data-Driven Optimization: Modern Decision-Making Under Uncertainty," Massachusetts Institute of Technology, Mar. 2006, pp. 1-39.

(Continued)

*Primary Examiner* — Mohamed A Wasel
(74) *Attorney, Agent, or Firm* — Stephen R. Yoder, Esq.; Kevin P. Radigan, Esq.; Heslin, Rothenberg, Farley & Mesiti, P.C.

(57) ABSTRACT

A message server includes a query store for storing query requests, value data for the query requests, and response time data for the query requests. A message is received, a query request is determined from the message and sent to a query server. A timeout period is determined from response time data stored in the query store. If no response to the query request is received within the timeout period, a value is determined from the value data for the query request stored in the query store. Alternatively, if a response to the query request is received within the timeout period, a value is determined from the response, value data for the value is stored in the query store, and response time data is stored in the query store. An action in response to the message is determined and the action is performed.

18 Claims, 5 Drawing Sheets

(56) References Cited

U.S. PATENT DOCUMENTS

| | | | |
|---|---|---|---|
| 8,156,217 B2* | 4/2012 | Ramamoorthy | H04L 67/1002 709/224 |
| 8,321,515 B1* | 11/2012 | Gailloux | H04L 51/34 709/206 |
| 8,515,884 B2 | 8/2013 | Doctor et al. | |
| 9,635,135 B1* | 4/2017 | Watson | H04L 67/325 |
| 2002/0099672 A1 | 7/2002 | Ganesh | |
| 2005/0198190 A1* | 9/2005 | Zavalkovsky | H04L 65/00 709/217 |
| 2007/0156666 A1* | 7/2007 | VanRiper | G06F 21/55 |
| 2010/0306370 A1* | 12/2010 | Taniguchi | H04L 43/0817 709/224 |
| 2012/0023062 A1 | 1/2012 | Vashist | |
| 2013/0346249 A1* | 12/2013 | Li | G06Q 30/0623 705/26.61 |
| 2014/0195847 A1* | 7/2014 | Webman | G06F 11/2094 714/6.22 |

OTHER PUBLICATIONS

Shahi, Ahmad, "Decision Making for Uncertain Data in Dynamic Environment Using Hybrid Method," 2009 IEEE International Conference on Control and Automation, Dec. 2009, pp. 398-403.

* cited by examiner

| Request | Response time | Value |
|---------|---------------|-------|
| SR1 | 0.004, 0.005 | 102, 102 |
| AR1 | 1.014, 1.022 | 104, 105 |
| AR2 | 0.020, 0.022 | 105, 100 |

| Request | Response time | Value |
|---------|---------------|-------|
| SR1 | 0.004, 0.005, 0.003 | 102, 102, 103 |
| AR1 | 1.014, 1.022, 1.012 | 104, 105, 100 |
| AR2 | 0.020, 0.022, 0.019 | 105, 100, 103 |

Figure 4d

PROCESSING A MESSAGE RECEIVED BY A MESSAGE SERVER

PRIOR FOREIGN APPLICATION

This application claims priority from United Kingdom (GB) patent application number 1416921.3, filed Sep. 25, 2014, which is hereby incorporated herein by reference in its entirety.

BACKGROUND

Aspects of the present invention relate to the processing of messages received by a message server, and message servers that process messages that they receive. In particular, one or more aspects of the invention relate to the processing of messages to send query requests to query servers, determining timeouts for receiving responses, and determining a value for a query request in the case that a response is not received within a determined timeout.

Modern messaging systems, such as the IBM WebSphere Enterprise Service Bus (WESB), often need, when sent messages, to obtain and process large volumes of data from external sources in order to make a decision in response to the message. Data may be obtained from synchronous sources, where there is a direct connection between the messaging system and the synchronous source, and/or from asynchronous sources, where the messaging system sends a request for data to the asynchronous source which should in due course respond, but there is no direct connection.

Traditional messaging systems have waited for a complete set of responses before making a decision. However, it is common for there to be a delay before a response is received, particularly when it is being obtained from an asynchronous source. Further, as there is no direct connection, a response from an asynchronous source may not be received at all. This can lead to a considerable delay before a decision is made, or at worst the decision is not made at all.

To mitigate this problem, it is known to wait a predetermined period for a response to be received, and if no response has been received in that period to make a decision based upon only the responses so far received. For example, a message system may have a "timeout" period of 5 seconds, after which it is assumed that no response will be received.

However, this can still result in large delays before decisions are made; and even if only a small delay is caused, this can have a considerable effect due to the large number of messages a modern messaging system will be processing.

Aspects of the present invention seek to solve and/or mitigate some or all of the above-mentioned disadvantages. Alternatively and/or additionally, aspects of the present invention seek to provide improved methods of processing messages received by a message server, and improved message servers that process messages that they receive.

SUMMARY

In accordance with an aspect of the present invention, a method of processing a message received by a message server is provided. The method includes receiving a message by the message server, the message server including a query store for storing query requests, value data for the query requests, and response time data for the query requests; determining at least one query request from the message; sending the at least one query request to a query server; determining a timeout period from the response time data for a query request stored in the query store; based on no response to the query request being received within the timeout period, determining a value from the value data for the query request stored in the query store; based on a response to the query request being received within the timeout period, determining a value from the response, storing value data for the value determined from the response in the query store, and storing response time data for a period a response took to be received in the query store; determining an action based on the message using the value obtained from the query store or the value determined from the response; and performing the action.

In accordance with another aspect of the present invention, a message server for processing a message is provided. The message server includes a processor; and a query store for storing query requests, value data for the query requests, and response time data for the query requests, wherein the message server is configured to perform a method. The method includes receiving a message by the message server; determining at least one query request from the message; sending the at least one query request to a query server; determining a timeout period from the response time data for a query request stored in the query store; based on no response to the query request being received within the timeout period, determining a value from the value data for the query request stored in the query store; based on a response to the query request being received within the timeout period, determining a value from the response, storing value data for the value determined from the response in the query store, and storing response time data for a period a response took to be received in the query store; determining an action based on the message using the value obtained from the query store or the value determined from the response; and performing the action.

In accordance with another aspect of the present invention, a computer program product for processing a message received by a message server is provided. The computer program product includes a computer readable storage medium readable by a processing circuit and storing instructions for execution by the processing circuit for performing a method. The method includes receiving a message by a message server, the message server including a query store for storing query requests, value data for the query requests, and response time data for the query requests; determining at least one query request from the message; sending the at least one query request to a query server; determining a timeout period from the response time data for a query request stored in the query store; based on no response to the query request being received within the timeout period, determining a value from the value data for the query request stored in the query store; based on a response to the query request being received within the timeout period, determining a value from the response, storing value data for the value determined from the response in the query store, and storing response time data for the period a response took to be received in the query store; determining an action based on the message using the value obtained from the query store or the value determined from the response; and performing the action.

BRIEF DESCRIPTION OF THE DRAWINGS

Embodiments of the present invention will now be described, by way of example only, with reference to the following drawings in which.

DETAILED DESCRIPTION

Figure 1:
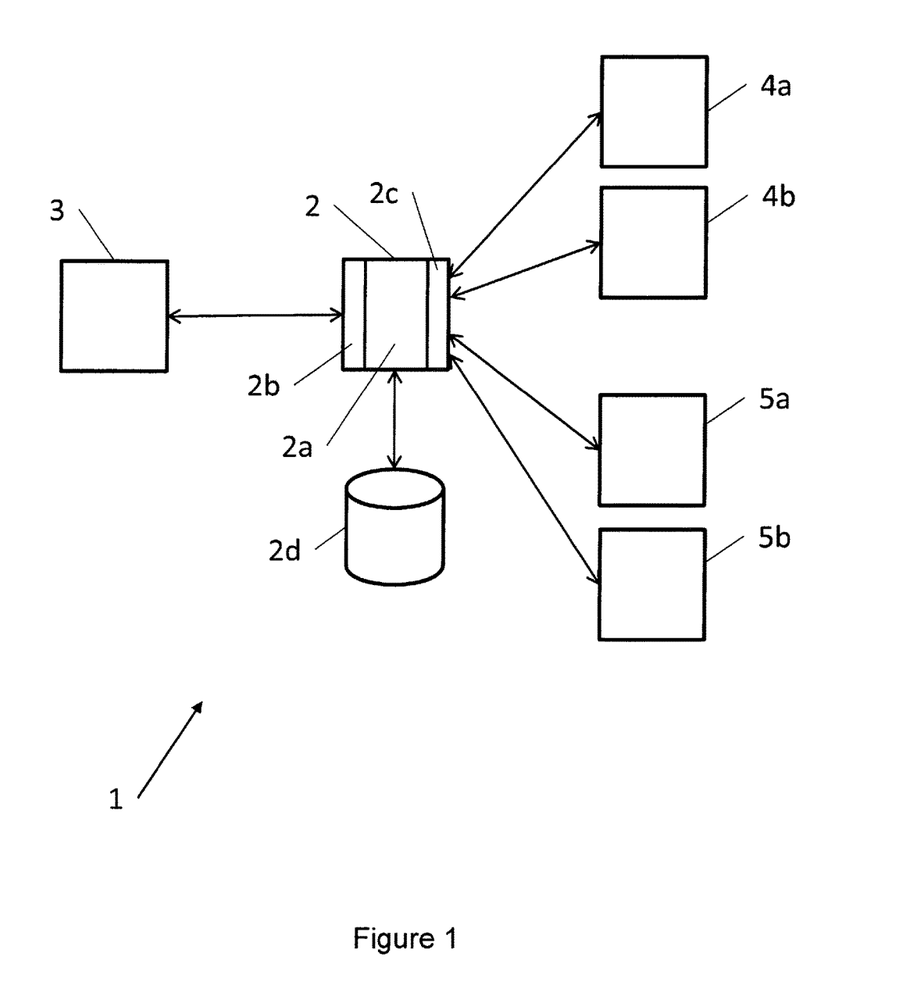
FIG. 1 shows one example of a computer system comprising a message server in accordance with an embodiment of the invention.

A computer system comprising a message server in accordance with an embodiment of the invention is shown in FIG. 1. The computer system 1 comprises the message server 2. The message server 2 comprises a processor 2a, which controls the operation of the message server 2. The message server 2 also comprises communication modules 2b and 2c, and a query request store 2d. The query request store 2d stores query requests, values for the query requests, and response times for the query requests, for query requests previously made by the message server 2 and for which a response has been successfully received.

The message server 2 is in communication with a client computer 3, via the communication module 2b. The message server 2 can receive messages from, and send messages to, the client computer 3. The message server 2 is also in communication with query servers 4a and 4b, and query servers 5a and 5b, via the communication module 2c. The message server 2 can send asynchronous requests to the query servers 4a and 4b, and can send synchronous requests to the query servers 5a and 5b. In alternative embodiments, the client computer 3 and query servers 4a, 4b, 5a and 5b are communicated with via a single communication module. In other alternative embodiments, the message server 2 can send both asynchronous and synchronous requests to a query server.

Figure 2:
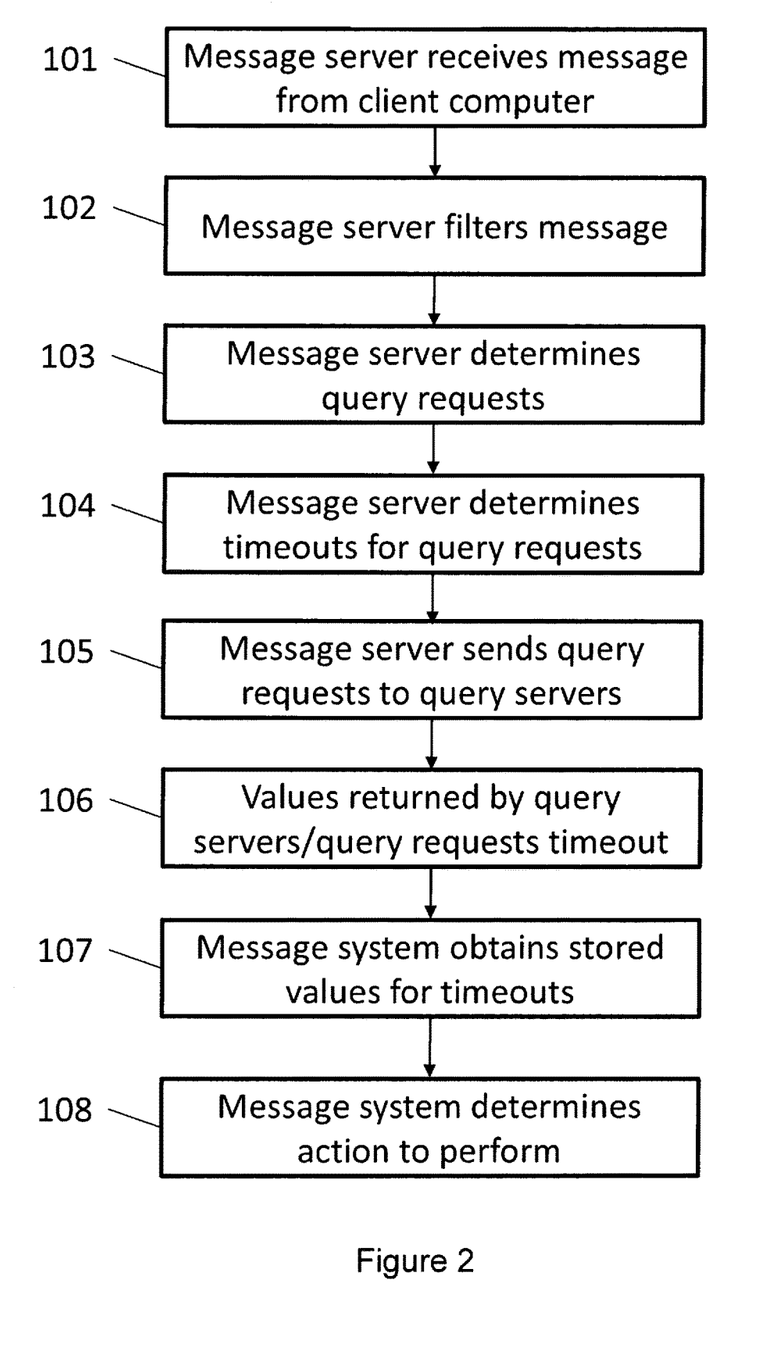
FIG. 2 is one example of a flowchart showing the operation of the message server of FIG. 1 when a message is received, in accordance with an aspect of the present invention.

The operation of the message server 2 is now described with reference to the flowchart of FIG. 2. First, the message server 2 receives a message from the client computer 3 (step 101). The message will comprise a number of fields $x_1$ to $x_n$ of data. The message server 2 then filters the message so that only the fields it requires remain (step 102), say fields $x_1$ and $x_3$. The message server 2 then uses the fields $x_1$ and $x_3$ of the filtered message to determine one or more query requests (step 103).

The message server 2 then uses the query request store 2d to determine timeouts for the one or more query requests (step 104), as described in more detail below. The one or more query requests are then sent to the appropriate query servers from the query servers 4a, 4b, 5a and 5b (step 105).

In due course, either the message server 2 receives a response from a query server to which a query response was sent, or the determined timeout for the query request passes, i.e. no response has been received within the determined time period and so the query request "times out" (step 106). For query requests that timed out, the message server 2 obtains the value corresponding to the query request from the query request store 2d (step 107). In alternative embodiments, the query request store 2d stores multiple values corresponding to a query request, in which case the message server 2 determines a value to obtain in an appropriate manner, for example selecting the most commonly returned value, or the value for the most recently made request.

The message server thus has a set of values corresponding to the query requests made, where the values have either been provided by responses made by the query servers 4a, 4b, 5a and 5b, or obtained from the query request store 2d when no response has been received from a query server within the determined timeout. The message server 2 then uses the values to determine an action to perform in response to the message (step 108), and then performs that action. The action may for example be the sending of a response message back to the client computer 3, to sending a message to another server.

Figure 3:
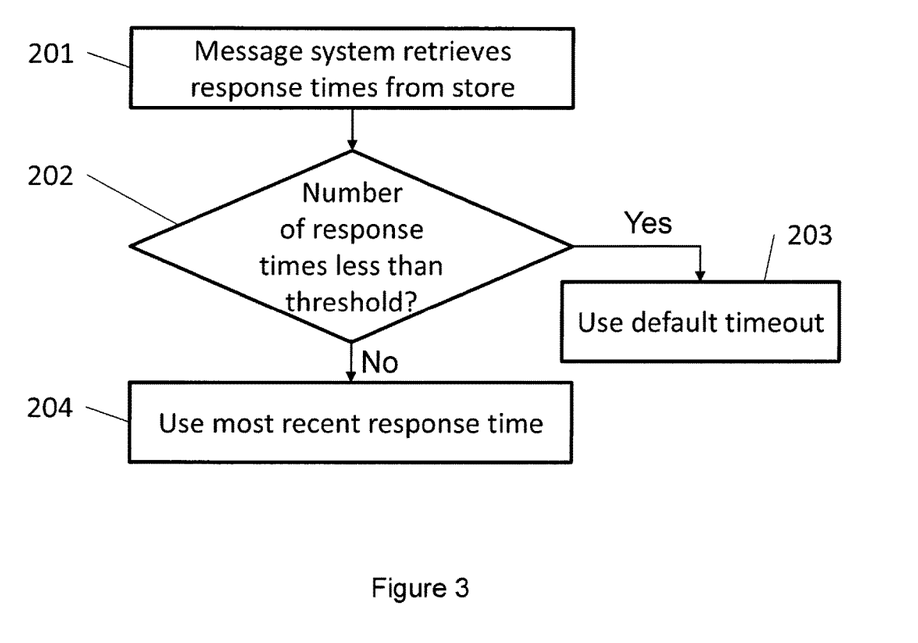
FIG. 3 is one example of a flowchart showing the operation of the message server to determine a timeout for a query request, in accordance with an aspect of the present invention.

The operation of the message server 2 when determining a timeout for a query request is now described with reference to the flowchart of FIG. 3. First, the message server retrieves any response times for the query request in the query request store 2d (step 201). If no response times are stored in the query request store, or the number of response times stored is less than a predetermined threshold (step 202), a default value is determined as the timeout (step 203). If the number of response times stored in the query request store is not less than the predetermined threshold (step 202 again), the most response time for the most recent query request made is determined as the timeout (step 204). In alternative embodiments, the timeout is determined from the stored response times in other ways; for example it may be determined to be the mean average, median average or mode of the stored response times.

An example of the operation of the message server 2 when messages are received is now described, with reference to FIGS. 4a to 4d. FIGS. 4a to 4d show the query request store and the data it stores as messages are received. In this example, the message server 2 is implementing a stock quote decision making system.

Initially, the message server 2 receives a first message:
[IBM, 7/1/2013, 9.01, UK, 1.544]
from the client computer 3. The fields of this message represent the stock symbol, message date, message time, country and exchange rate respectively.

First, the message is filtered so that only the required fields remain; in this example, the required fields are the stock symbol, message date and message time, and so the filtered message is as follows:
[IBM, 7/1/2013, 9.01].

The message server 2 then uses the filtered message to determine query requests to query servers. In this example, there is a synchronous query request SR1 to query server 5a requesting the credit rating for the stock symbol IBM, an asynchronous query request AR1 to query server 4a requesting the stock price for the stock symbol IBM at the message date and time (i.e. at 9.01 on 1/1/2013), and an asynchronous query request AR2 to query server 4b requesting the current stock price for the stock symbol IBM.

Figure 4A:
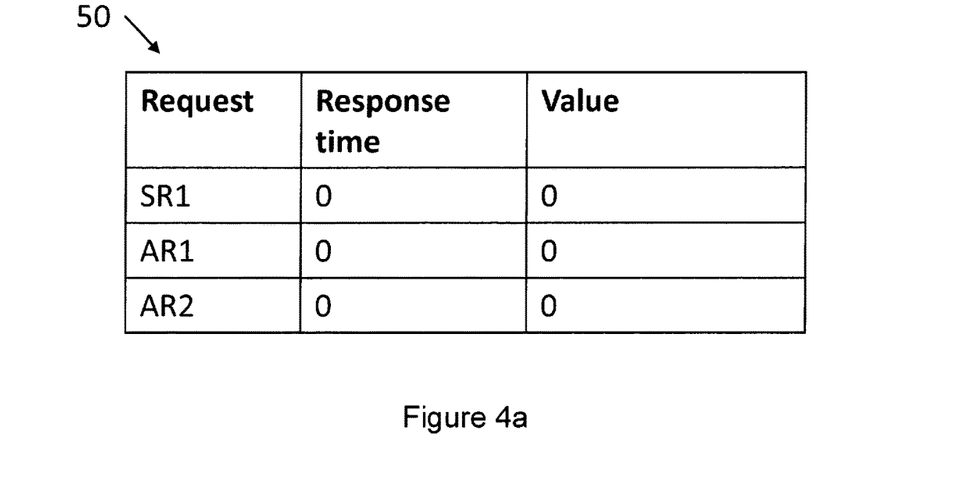
FIGS. 4a to 4d show examples of a query store comprised in the message server for storing query requests, value data for the query requests, and response time data for the query requests.

The message server 2 uses the query store database 2d to determine timeouts for the query requests SR1, AR1 and AR2. The current state of the query store database 2d is shown in FIG. 4a, which is in an initial state holding all zeros as no query request data has yet been stored. As a result, the default timeout is used, in this case 1 second.

Figure 4B:
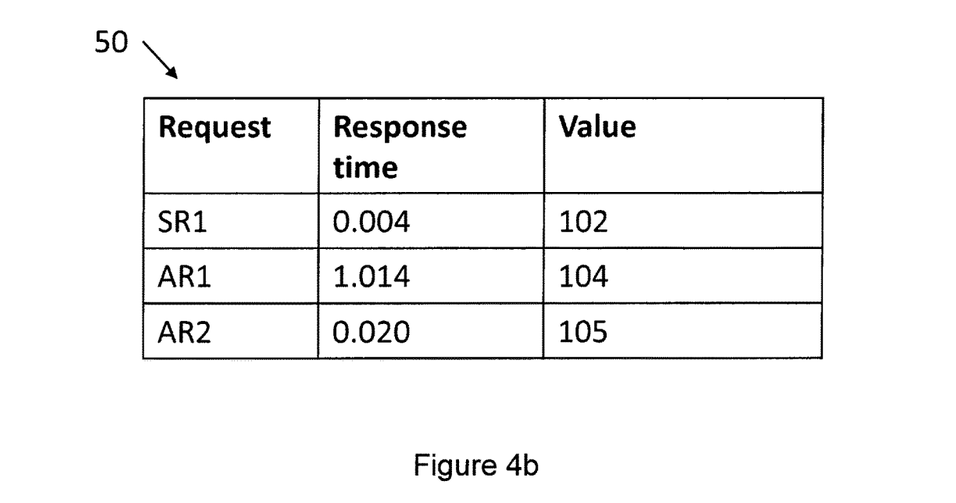

The message server 2 then sends the query requests to the query servers 4a, 4b and 5a. The message server 2 waits an initial period of 1 second. Responses to SR1 and AR2 are returned within this period, at times 0.004 and 0.020 seconds respectively. However, a response for AR1 is not returned within this period, and so the message server waits the further determined timeout period of 1 second (i.e., 2 seconds in total), and the response is returned at time 1.014 seconds. The returned values (102, 104 and 105 respectively) and response times are stored in the query request database 2d, as shown in FIG. 4b. The returned values are also used to determine the action to be taken. In this example, it may be determined that the credit rating (102) is above a required threshold, and the current stock price (105) is sufficiently close to the stock price when the message was sent (104). As a result, the action determined is to send a buy instruction to a stock-exchange server to buy the stock.

Next, the message server 2 receives a second message:
[IBM, 7/1/2013, 9.02, UK, 1.544]
which is filtered to give:
[IBM, 7/1/2013, 9.02].

The message server 2 again determines the query requests SR1, AR1 and AR2, where on this occasion AR1 is the stock price at time 9.02. The message server 2 again determines the timeouts for the query requests. In this case, while the query request database 2d now contains response time information, there is only data for a single request which is less than the threshold, which for this example is two requests. Therefore the determined timeouts are again each one second.

Figure 4C:
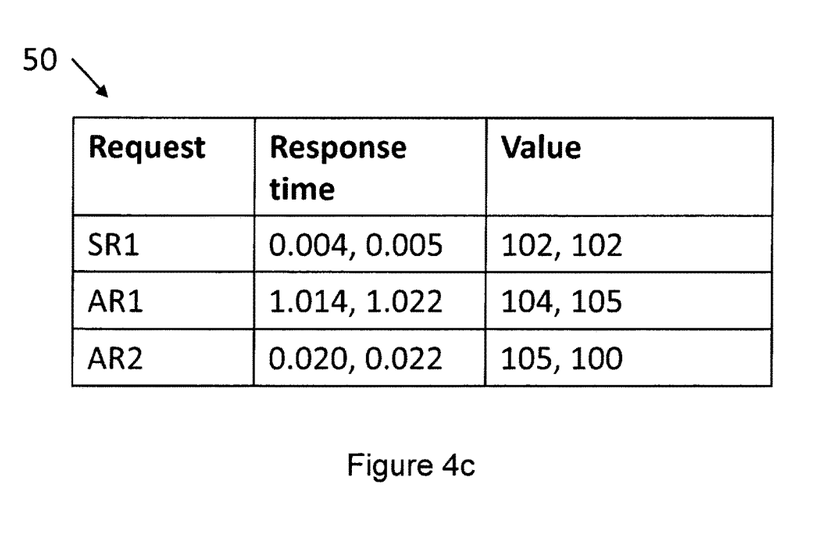

As before, the message server 2 waits an initial period of 1 second. Responses to SR1 and AR2 are returned within this period, at times 0.005 and 0.022 seconds respectively. Again, a response for AR1 is not returned within this period, and so the message server waits the further determined timeout period of 1 second again, and the response is returned at time 1.022 seconds. As before, the returned values (102, 105 and 100 respectively) and response times are stored in the query request database 2d, as shown in FIG. 4c, and the returned values are used to determine the action to be taken. In this case, the current stock price (100) may be determined to be too far away from the stock price when the message was sent (104), and so the action determined is to send a message back to the client computer 3 that no buy instruction has been sent.

Next, the message server 2 receives a third message:
[IBM, 7/1/2013, 9.03, UK, 1.544]
which is filtered to give:
[IBM, 7/1/2013, 9.03].

The message server 2 again determines the query requests SR1, AR1 and AR2, where AR1 is the stock price at time 9.03. The message server 2 again determines the timeouts for the query requests. On this occasion the query request database 2d contains sufficient response time information that the threshold is met, and so the determined timeouts for SR1, AR1 and AR2 are 0, 0.014 and 0, i.e. the minimum stored response times minus the initial wait time of 1 second, where a floor of zero is used where otherwise there would be a negative timeout.

Figure 4D:
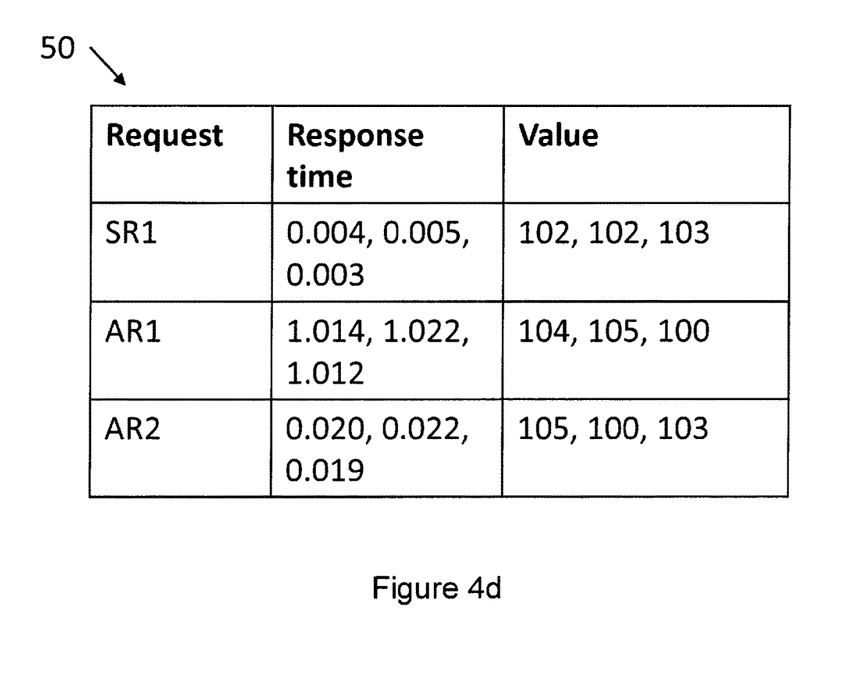

As before, the message server 2 waits an initial period of 1 second. Responses to SR1 and AR2 are returned within this period, at times 0.003 and 0.019 seconds respectively. Again, a response for AR1 is not returned within this period, and so the message server waits the further determined timeout period of 0.014 seconds. On this occasion, the response is returned at time 1.012 seconds. The returned values (103, 100 and 103 respectively) and response times are stored in the query request database 2d, as shown in FIG. 4d, and the returned values are used to determine the action to be taken, in this case to send an appropriate buy instruction.

Next, the message server 2 receives a fourth message:
[IBM, 7/1/2013, 9.04, UK, 1.544]
which is filtered to give:
[IBM, 7/1/2013, 9.04].

The message server 2 again determines the query requests SR1, AR1 and AR2, where AR1 is the stock price at time 9.04. The message server 2 again determines the timeouts for the query requests. On this occasion, the determined timeouts for SR1, AR1 and AR2 are 0, 0.012 and 0.

As before, the message server 2 waits an initial period of 1 second, and responses to SR1 and AR2 are returned within this period, with values of 103 and 101 respectively. A response for AR1 is not returned within this period, and so the message server waits the further determined timeout period of 0.012 seconds. However, on this occasion no response is returned within this further timeout period. Consequently, instead of waiting for a response to be returned, the message server 2 obtains the most recent value for AR1 from the query request database 2d, i.e. the value of 100 for the third message, and uses that as the value for AR1.

The message server 2 then determines the action to take using the returned values for SR1 and AR2, and the value obtained from the query request database 2d for AR1. In this way, the message server 2 is able to determine and perform the action without being unduly delayed by the delay in receiving the response for query request AR1 from the query server 4a.

As described herein, in accordance with one aspect of the invention, there is provided a method of processing a message received by a message server, wherein the message server comprises a query store for storing query requests, value data for the query requests, and response time data for the query requests, the method comprising: receiving a message; determining at least one query request from the message; sending the at least one query request to a query server; determining a timeout period from the response time data for the query request stored in the query store; in the case that no response to the query request is received within the timeout period, determining a value from the value data for the query request stored in the query store; in the case that a response to the query request is received within the timeout period, determining a value from the response, storing value data for the value in the query store, and storing response time data for the period the response took to be received in the query store; determining an action in response to the message using the value obtained from the query store or the value obtained from the response; and performing the action.

By storing response times for query requests, the message server can determine a timeout period for a query request that is calibrated to its likely response time based on its behavior in the past. In this way, the message server does not wait for a long fixed timeout period when it is unlikely that any response will be received. (For example, if a query server usually responds in well under 1 second, it is unlikely that a response will be received after that time.) However, the message server can still wait for a longer period for a query server that is likely to take longer to respond. (For example, for a query server that usually takes around 1.5 seconds to respond.) By storing value data for query requests, values for query requests can be provided even if no response is received within the timeout period.

The stored value data may be the values determined from the responses. Alternatively, the value data may be data from which the values can be determined, for example the complete response received. The stored response time data may be the actual response times. Alternatively, the response time data may be data from which a timeout period can be determined, for example a minimum response time, average response time or previous timeout period.

In one embodiment, the at least one query request comprises an asynchronous request. This is advantageous as asynchronous requests typically take longer to return a response. Additionally and/or alternatively, the at least one query request comprises a synchronous request.

In a further embodiment, the method further comprises filtering the message to remove data not used to determine a query request.

The timeout period may be the minimum period a response to the query request has taken to be received. Alternatively, the timeout period may be a mean average response time, median average response time, mode response time, minimum response time plus a constant period (e.g. 0.05 seconds), or any other suitable period.

In one embodiment, in the case the amount of response time data for the query request stored in the query store is below a predetermined threshold, the timeout period is a default time period. This is advantageous as a timeout period determined from only a small number of response times may not give a result in a suitable timeout period, due to statistical anomalies.

The action may be sending a request to another server. Alternatively and/or additionally, the action may be sending a response to the sender of the message, or any other suitable action.

In accordance with another aspect of the invention, there is provided a message server for processing a message, comprising a processor, and a query store for storing query requests, value data for the query requests, and response time data for the query requests, wherein the message server is arranged to: receive a message; determine at least one query request from the message using the processor; send the at least one query request to a query server; determine a timeout period from the response time data for the query request stored in the query store using the processor; in the case that no response to the query request is received within the timeout period, determine a value from the value data for the query request stored in the query store using the processor; in the case that a response to the query request is received within the timeout period, determine a value from the response using the processor, store value data for the value in the query store, and store response time data for the period the response took to be received in the query store; determine an action in response to the message using the value obtained from the query store or the value obtained from the response using the processor; and perform the action.

In one embodiment, the at least one query request comprises an asynchronous request.

In a further embodiment, the message server is arranged to filter the message to remove data not used to determine a query request.

The timeout period may be the minimum period a response to the query request has taken to be received.

In the case the amount of response time data for the query request stored in the query store is below a predetermined threshold, the timeout period is a default time period, in one example.

The action may be sending a request to another server.

In accordance with yet another aspect of the invention, there is provided a computer program product for processing a message received by a message server, the computer program product comprising a computer-readable storage medium having computer-readable program code embodied therewith, the computer-readable program code configured to perform any of the methods described above.

In accordance with a further aspect of the invention, there is provided a computer program product for processing a message received by a message server, the computer program product comprising a computer-readable storage medium having computer-readable program code embodied therewith, the computer-readable program code configured when executed on a computer system to provide any of the computer systems described above.

It will of course be appreciated that features described in relation to one aspect of the present invention may be incorporated into other aspects of the present invention. For example, the method of the invention may incorporate any of the features described with reference to the apparatus of the invention and vice versa.

While aspects of the present invention have been described and illustrated with reference to particular embodiments, it will be appreciated by those of ordinary skill in the art that aspects of the invention lend itself to many different variations not specifically illustrated herein.

Aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or control code written in any combination of one or more programming languages, including an control oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of processing a message received by a message server, the method comprising:
    receiving a message by the message server, the message server comprising a query store for storing query requests, value data for the query requests, and response time data for the query requests;
    based on receiving the message at the message server, filtering the message to determine, by the message server, a query request from the message, the query request being included in the query store;
    sending the query request to a query server;
    determining a timeout period from the response time data for the query request stored in the query store;
    based on no response to the query request being received by the message server within the timeout period, determining a value from the value data for the query request stored in the query store;
    based on a response to the query request being received by the message server within the timeout period, determining a value from the response, storing value data for the value determined from the response in the query store, and storing in the query store response time data for a period the response took to be received by the message server;
    determining by the message server an action based on the message using the value obtained from the query store or the value determined from the response; and
    performing by the message server the action.

2. The method of claim 1, wherein the query request comprises an asynchronous request.

3. The method of claim 1, further comprising filtering the message to remove data not used to determine the query request.

4. The method of claim 1, wherein the timeout period is a minimum period a response to the query request has taken to be received.

5. The method of claim 1, wherein based on an amount of response time data for the query request stored in the query store being below a predetermined threshold, the timeout period is a default time period.

6. The method of claim 1, wherein the action is sending a request to another server.

7. A message server for processing a message, comprising:
    a processor; and
    a query store for storing query requests, value data for the query requests, and response time data for the query requests, wherein the message server is configured to perform a method, the method comprising:
        receiving a message by the message server, the message server comprising a query store for storing query requests, value data for the query requests, and response time data for the query requests;

based on receiving the message at the message server, filtering the message to determine, by the message server, a query request from the message, the query request being included in the query store;

sending the query request to a query server;

determining a timeout period from the response time data for the query request stored in the query store;

based on no response to the query request being received by the message server within the timeout period, determining a value from the value data for the query request stored in the query store;

based on a response to the query request being received by the message server within the timeout period, determining a value from the response, storing value data for the value determined from the response in the query store, and storing in the query store response time data for a period the response took to be received by the message server;

determining by the message server an action based on the message using the value obtained from the query store or the value determined from the response; and performing by the message server the action.

8. The message server of claim 7, wherein the query request comprises an asynchronous request.

9. The message server of claim 7, wherein the method further comprises filtering the message to remove data not used to determine the query request.

10. The message server of claim 7, wherein the timeout period is a minimum period a response to the query request has taken to be received.

11. The message server of claim 7, wherein based on an amount of response time data for the query request stored in the query store being below a predetermined threshold, the timeout period is a default time period.

12. The message server of claim 7, wherein the action is sending a request to another server.

13. A computer program product for processing a message, comprising:

a non-transitory computer readable storage medium readable by a processing circuit and storing instructions for execution by the processing circuit for performing a method comprising:

receiving a message by the message server, the message server comprising a query store for storing query requests, value data for the query requests, and response time data for the query requests;

based on receiving the message at the message server, filtering the message to determine, by the message server, a query request from the message, the query request being included in the query store;

sending the query request to a query server;

determining a timeout period from the response time data for the query request stored in the query store;

based on no response to the query request being received by the message server within the timeout period, determining a value from the value data for the query request stored in the query store;

based on a response to the query request being received by the message server within the timeout period, determining a value from the response, storing value data for the value determined from the response in the query store, and storing in the query store response time data for a period the response took to be received by the message server;

determining by the message server an action based on the message using the value obtained from the query store or the value determined from the response; and performing by the message server the action.

14. The computer program product of claim 13, wherein the query request comprises an asynchronous request.

15. The computer program product of claim 13, wherein the method further comprises filtering the message to remove data not used to determine the query request.

16. The computer program product of claim 13, wherein the timeout period is a minimum period a response to the query request has taken to be received.

17. The computer program product of claim 13, wherein based on an amount of response time data for the query request stored in the query store being below a predetermined threshold, the timeout period is a default time period.

18. The computer program product of claim 13, wherein the action is sending a request to another server.

* * * * *